United States Patent [19]
Valentino

[11] 3,747,626
[45] July 24, 1973

[54] COMBINED CHECK AND RELIEF VALVE

[76] Inventor: Joseph V. Valentino, 1120 Jensen Ave., Mamaroneck, N.Y. 10543

[22] Filed: May 5, 1971

[21] Appl. No.: 140,463

[52] U.S. Cl. ............................................. 137/102
[51] Int. Cl. ........................................... F16k 15/18
[58] Field of Search .................................. 137/102

[56] References Cited
UNITED STATES PATENTS

| | | | |
|---|---|---|---|
| 3,510,172 | 5/1970 | Pekrul | 137/102 X |
| 2,252,418 | 8/1941 | Shelley | 137/102 |
| 2,706,487 | 4/1955 | Wilson | 137/102 |
| 3,419,030 | 12/1968 | Gratzmuller | 137/102 |

Primary Examiner—Robert G. Nilson
Attorney—James and Franklin

[57] ABSTRACT

A valve structure functions as a check valve, permitting flow of fluid therethrough only in one direction, and as a relief valve, permitting pressure to be vented when it exceeds a given value. The valve is provided with inlet, outlet and relief ports. Valve actuating means is exposed to the inlet and outlet pressures and is variably positioned in accordance with the changing differential between those pressures in order to permit fluid flow from inlet to outlet but not in the opposite direction. If the outlet pressure exceeds a predetermined value that actuating means is moved to a position in which the normally closed relief port is opened, thereby to vent the excess pressure.

20 Claims, 5 Drawing Figures

Patented July 24, 1973 3,747,626

INVENTOR
JOSEPH V. VALENTINO
BY
ATTORNEY

Patented July 24, 1973
3,747,626
2 Sheets-Sheet 2
FIG. 3
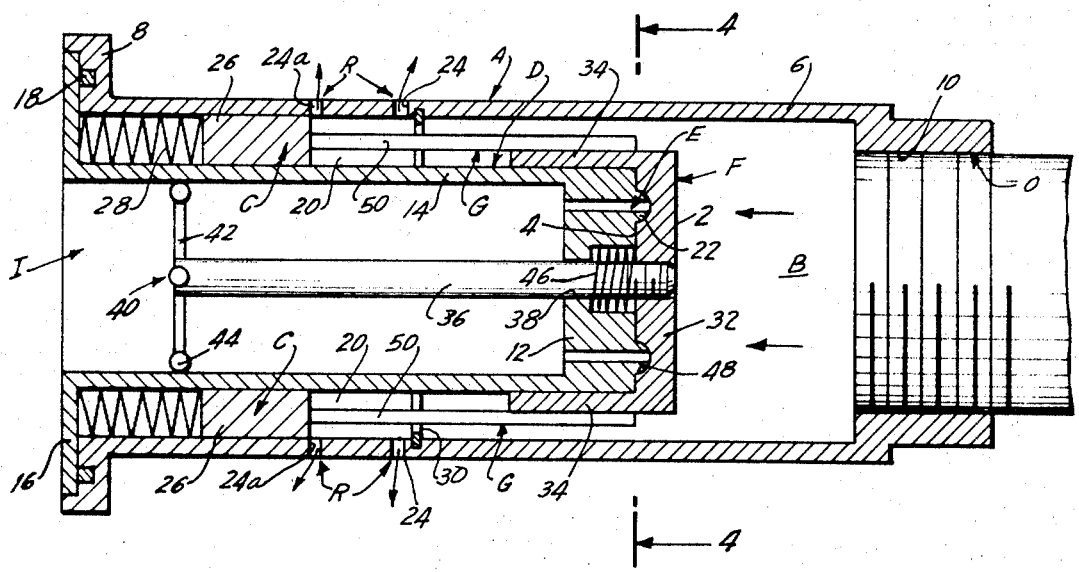
FIG. 4
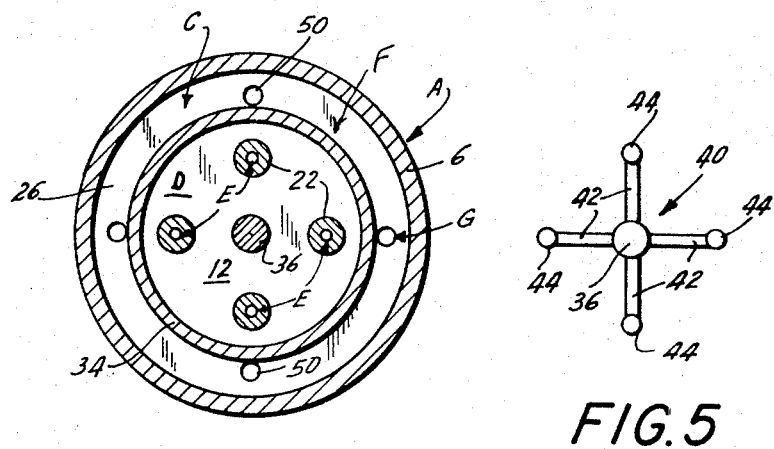
FIG. 5
INVENTOR
JOSEPH V. VALENTINO
BY
ATTORNEY

COMBINED CHECK AND RELIEF VALVE

The present invention relates to a valve construction which permits fluid flow therethrough from inlet to outlet but not in the opposite direction, and which, if the outlet pressure exceeds a predetermined value, will vent that outlet pressure to the surrounding atmosphere.

There are many applications where check valves, i.e., valves which permit fluid flow in one direction but not in the other, are used. Such valves are provided with inlet and outlet ports and function to permit fluid flow therethrough from inlet to outlet when the pressure at the inlet exceeds that at the outlet, and to prevent fluid flow therethrough from outlet to inlet when the pressure at the outlet exceeds that at the inlet. One typical application for valves of this type is in inflating apparatus. A suitable pump is connected to the inlet port and the device to be inflated is connected to the outlet port. The pump functions to force quantities of fluid into the device to be inflated, and while the pump is on its intake stroke, the pressure exerted thereby on the valve then being at a low value, the fluid previously pumped into the device being inflated is retained in that device.

Usually inflating operations must be carefully monitored and controlled, because if the inflation action is continued beyond a predetermined point the device being inflated may be damaged and, indeed, may burst or explode. One way to prevent this from happening is to carefully supervise the inflation operation and stop it when the pressure in the device being inflated reaches a predetermined value. This calls for constant vigilance on the part of the operator. Where that vigilance cannot be supplied, or where the situation is sufficiently fraught with danger so that personal vigilance cannot be safely relied upon, special means may be provided for producing automatic supervision of the inflation operation. Pressure-sensing devices may be employed in conjunction with apparatus for controlling and stopping the inflation operation when an excessive pressure is sensed. Relief valves may be provided which, when connected to the device being inflated, will vent that device to the surrounding atmosphere if the pressure therein exceeds its predetermined value. These approaches are satisfactory, but they suffer from the drawback of being comparatively expensive and of requiring additional apparatus in order for the designed functions to be carried out.

It is the prime object of the present invention to provide a single mechanism which will function both as a check valve and as a relief valve. Hence inflation can be effected with full safety through the use of but a single valve unit.

A further object of the present invention is to provide a combined check and relief valve in which only a single pressure-sensitive movable member is provided, that single movable member producing both the check function and the relief function.

It is yet another object of the present invention to provide a combined check and relief valve the construction of which is simple and inexpensive, yet which is reliable and virtually fool-proof in operation.

It is an additional object of the present invention to devise a combined check and relief valve the parts of which are simple and sturdy, and which need not be made to any high degree of precision.

To these ends the valve of the present invention comprises a housing having an inlet port and an outlet port. A conduit extends partially through said housing from the inlet port toward the outlet port, that conduit terminating in a passage which communicates between the interior of the conduit and the chamber formed within the housing, the chamber in turn communicating with the outlet port. The housing is also provided with relief ports which communicate with the chamber. The relief ports are normally closed by means which can be moved to a port-opening condition. Movably mounted in the chamber is an actuating means in the form of a piston-like member one side of which is normally exposed to the pressure at the outlet port and the other side of which is normally exposed, through the conduit and the passage in that conduit, to the pressure at the inlet port. This movable member moves through a plurality of positions, in one of which it exposes the passage at the end of the conduit so as to permit fluid to flow from the inlet port through the conduit and pass into the chamber and then out from the chamber through the outlet port. In another position the movable member seals off the conduit passage, thus preventing fluid from flowing from the outlet port into the chamber and then to the inlet port through the conduit. Once the movable member has moved from its first described through its second described position, it is then permitted further movement, still closing off the conduit passage, to a third position in which it operatively engages the relief port control means and opens that port. The movable member will be moved to this third position only when the pressure at the outlet port exceeds a predetermined value or, more exactly considered, when the differential between the pressure at the outlet port and the pressure at the inlet port exceeds a predetermined value. Hence with but a single pressure-sensitive movable element both a check valve function and a relief valve function is achieved, the relief valve function occurring at the same time as the check valve function.

While the present invention will be here described in terms of its use in an inflation system, with a pump adapted to be connected to the inlet port, with a device to be inflated adapted to be connected to the outlet port, and with the relief ports being vented to the surrounding atmosphere, it will be apparent that this is by way of exemplification only, and that the utility of the present invention is not limited to such a system.

To the accomplishment of the above, and to such other objects as may hereinafter appear, the present invention relates to the construction and arrangement of a combined check and relief valve, as defined in the appended claims, and as described in this specification, taken together with the accompanying drawings, in which:

FIG. 3 is a view similar to FIGS. 1 and 2 but showing the actuating means in a position where it opens the relief ports while at the same time preventing fluid flow to the inlet port, thereby venting the interior of the valve to the surrounding atmosphere;

FIG. 4 is a cross sectional view taken along the line 4—4 of FIG. 3; and

FIG. 5 is an end elevational view of the guide portion of the actuating means which slides along the inside of the conduit.

The valve of the present invention comprises a housing generally designated A having an inner chamber generally designated B, an inlet port generally designated I, an outlet port generally designated O, and a relief port or ports generally designated R. Control means generally designated C is active in connection with the relief ports R so as normally to close those ports but, when actuated, to open the ports and thus vent the chamber B to the surrounding atmosphere. A conduit generally designated D is received within the housing A and communicates between the inlet port I and a passage generally designated E through a wall of the conduit D, the passage E communicating between the interior of the conduit D and the chamber B. Movably mounted within the chamber B is a piston-like actuating means generally designated F, one side 2 of which is exposed to the outlet port O and hence to the fluid pressure existing at that port, while the other side 4 of the actuating means F is operatively exposed to the inlet port I and hence to the fluid pressure there existing.

Figure 1:
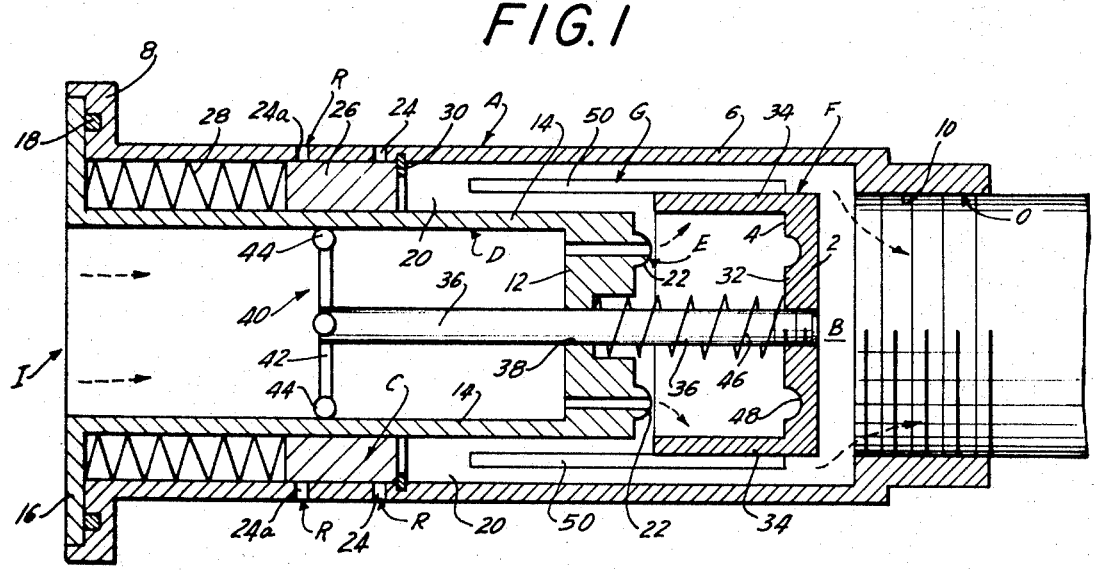
FIG. 1 is a cross sectional view of one embodiment of the present invention, the valve actuating means being shown in a position such as to permit fluid flow from inlet port to outlet port.
Figure 2:
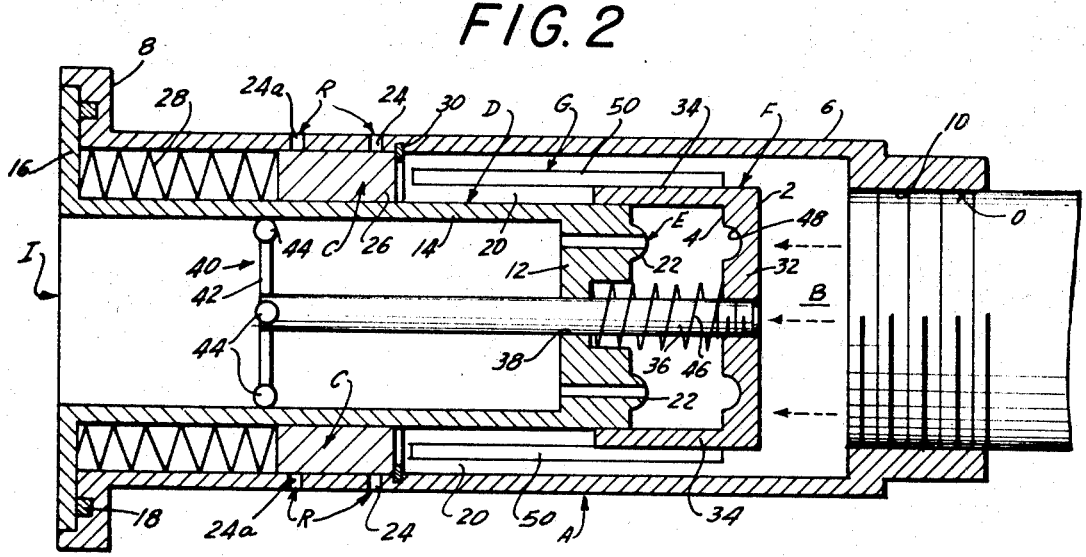
FIG. 2 is a view similar to FIG. 1 but showing the actuating means performing its check valve function, preventing fluid flow from outlet port to inlet port, while the relief ports remain closed.

The actuating means F is movable between a first position shown in FIG. 1, a second position shown in FIG. 2 and a third position shown in FIG. 3. In the first position shown in FIG. 1 the actuating means F is spaced from the end of the conduit I, thereby opening the passage E and permitting fluid flow from the inlet port I through the conduit D and the passage E into the chamber B and then from the chamber B out through the outle port O. The actuating means F will assume its FIG. 1 position when the pressure at the inlet port I is in excess of the pressure at the outlet port O, thus moving the actuating means F to the right to its position illustrated in FIG. 1.

When the fluid pressure at the outlet port O exceeds that at the inlet port I the actuating means F will be moved to the left from its position shown in FIG. 1 to its position shown in FIG. 2. In its FIG. 2 position it sealingly engages the conduit D and blocks off the passage E, thereby preventing flow of fluid from the outlet port O to the inlet port I. It thus produces a check valve action.

In normal use, when the fluid pressure at the outlet port O does not exceed a predetermined value relative to the pressure at the inlet port I, the actuating means F will move between its FIG. 1 and FIG. 2 positions, permitting fluid flow from inlet port I to outlet port O but not in the opposite direction. If, however, the fluid pressure at the outlet port O should exceed a predetermined value relative to the fluid pressure at the inlet port I, the actuating means F will be moved further to the left to its position shown in FIG. 3. When this occurs the parts generally designated G, which are connected to and move with the actuating means F, engage the control means C for the relief ports R and open those ports R, thus venting the chamber B to the surrounding atmosphere and relieving the excess pressure existing at the outle port O. Thus a relief valve action is produced. When the fluid pressure at the outlet port O then falls to a normal value, the actuating means F will move to the right from its FIG. 3 position to its FIG. 2 position, causing the relief port control means C to close the relief ports R, while still retaining the check action of the valve.

Turning now more particularly to the specific structure disclosed by way of exemplification, the housing A comprises a cylindrical wall 6 having a flange 8 at the inlet end and having an internally threaded passage 10 at the outlet end, the latter defining the outlet port O. A device to be inflated or supplied with fluid is adapted to be connected to the outlet port O. The conduit D comprises an end wall 12 and a cylindrical side wall 14, the latter having a flange 16 which is fixedly received inside the housing flange 8, a sealing ring 18 being compressed between the flanges for sealing purposes. The conduit D is smaller in cross sectional diameter than the housing A, thereby defining a space 20 between the two. The open end of the conduit D, at the inlet end of the valve, may be internally threaded, and defines the inlet port I to which a pump or other fluid source may be connected. The passages E which communicate between the interior of the conduit D and the housing chamber B are formed in the conduit end wall 12, and may terminate in nipple-like protrusions 22.

The relief ports R are formed in the housing wall 6 so as to communicate between the space 20 formed between the outside atmosphere and the housing wall 6 and the conduit wall 14. These ports R may be in the form of a number of circumferentially disposed openings 24, as here specifically disclosed arranged in a pair of axially disposed rows of openings 24 and 24a. The relief port control means C is here disclosed as a cylindrical piston-like member 26 snugly received in the space 20 so as to make effective sealing engagement with the inner surface of the housing wall 6 and the outer surface of the conduit 14, the piston-like member 26 being urged to the right, as viewed in the drawings, by means of one or more springs 28 received within the space 20 and compressed between the conduit flange 16 and the part 26, the spring-urged movement of the part 26 to the right as viewed in the drawings being positively limited by means of stop ring 30 mounted on the inner surface of the housing wall 6. The stop ring 30 is so located that when the part 26 is pressed thereagainst by the spring 28, the part 26 will cover and block all of the relief ports 24 and 24a.

The actuating means F is here shown as comprising an end wall 32 from which a cylindrical wall 34 extends to the left, the inner diameter of the wall 34 being closely the same as the outer diameter of the conduit D, whereby the actuating means F is sealingly slidably telescopable over the conduit D. A mounting rod 36 is secured to the end wall 32, sealingly slidably passes through an opening 38 in the conduit end wall 12, extends into the interior of the conduit D, and there carries a bearing member generally designated 40 in the form of a plurality of arms 42 extending radially out from the rod 36 and carrying enlarged parts 44 at their outer ends which slidably engage the inner surface of the conduit wall 14. A spring 46 surrounds the portion of the rod 36 outside the conduit D and is compressed between the end wall 32 of the actuating means F and the end wall 12 of the conduit D, thereby biasing the actuating means F to its position shown in FIG. 1. The end wall 32 of the actuating means F may be provided with depressions 48 adapted to register with and receive therein the protrusions 22 on the wall 12 of the conduit D. The actuating means F also comprises rod-like parts 50, defining the means G for actuating the relief port control means C, those parts 50 extending freely into the space 20 between the housing wall 6 and the conduit wall 14 and being aligned with the spring-urged part 26 which normally closes the relief ports 24 and 24a.

When the fluid pressure at inlet port I exceeds that at outlet port O, as will be the case, for example, when a pump is active to force fluid into the valve via the inlet port I, a greater force will be exerted on the side 4 of the actuating means end wall 32 than on the side 2 thereof, and hence the actuating means F, aided by the action of the biasing spring 46, will move to its position shown in FIG. 1, in which the wall 34 thereof has moved off from the conduit D. As a result fluid can floW through the conduit D and the passages E, around the exposed edge of the actuating means wall 34, into and through the chamber B in the housing A, and then out through the outlet port O. While this takes place the springs 28 move the part 26 against the stop 30, thus closing off the relief ports R. This is the condition of valves during the pumping stage, as shown in FIG. 1.

During normal pumping operation, when the pump is on its intake stroke the pressure at the inlet port will drop relative to the pressure at the outlet port O. Thus the pressure exerted on the side 2 of the actuating member end wall 32 will exceed that exerted on its end wall 4, the actuating member F will move to the left against the action of the biasing spring 46, and its wall 34 will telescope over the end of the conduit D. This will seal off the passages E from the chamber B, and hence no fluid can flow through the conduit D to the inlet port I. Thus check valve action is achieved, as is disclosed in FIG. 2. The pressure in the chamber B will be exerted against the relief port control means part 26, but the springs 28 will be strong enough to overcome that pressure, and hence the relief ports R will remain closed.

If the pressure in the device being inflated increases, then the pressure exerted against the side 2 of the actuating member end wall 32 will correspondingly increase relative to the pressure exerted against the opposite side 4 thereof, and the actuating member F will be moved further to the left than it is in the condition shown in FIG. 2. This will result in a further compression of the spring 46, which will resist such movement of the actuating member F. This movement will continue with increasing outlet port pressure until the rod-like parts 50 engage the part 26 and push it to the left against the action of the springs 28. This movement will continue until the ports 24, or some of them, are opened, and when that occurs the chamber B is vented to the surrounding atmosphere. In this way means are provided for relieving any excess pressure which may be developed in the device operatively connected to the outlet port O of the valve. Depending upon the operating conditions to which the valve is designed to be subjected, either a single relief port R may be provided or, as is here specifically disclosed, a plurality of such ports may be provided. A plurality of ports may be provided all at the same axial location along the housing A or, as is here specifically disclosed, relief ports R may be provided at different locations axially along the housing A. Thus a certain minimum amount of venting may be provided for low values of excess pressure, the part 26 then being forced to the left against the action of the spring 28 so as to open only the right hand relief ports R but still obstructing the left hand such ports, whereas if the excess pressure is exceedingly high the part 26 will be moved to the left to the position shown in FIG. 3, opening all of the relief ports R and thus providing for more rapid venting of excess pressure.

After sufficient venting has been provided so that the pressure in the device being inflated, and hence the pressure at the outle port O, returns to a predetermined value, the spring 28 will expand, the part 26 will move to the right so as to be stopped by the ring 30, and the parts of the valve will resume a position such as that shown in FIG. 2.

It will be understood that while the pressure at the outlet port O is active directly on the right hand face of the part 26, thus tending to move the part 26 to the left and therefore to compress the spring 28, the area of the part 26 thus presented to that pressure will normally be inSufficiently large to enable the parts 26 to be moved to the left by that pressure. It is for this reason that the actuating means F is provided with the parts 50, that actuating means F having a large area surface 2 which is exposed to the pressure at the outlet orifice O, thereby to develop an appreciable amount of force tending to move it to the left, as viewed in the figures, that appreciable force being transmitted by the parts 50 to the part 26.

It will be appreciated from the above that the valve of the present invention may be made of simple and sturdy parts, in the main not requiring a high degree of precision manufacture, only a single one of those parts being operatively sensitive to the pressures involved and being movable in response to pressure differential, that single moving part controlling both the checking function and the relief function of the valve. Thus flexibility in operation is achieved by means of a simple and reliable structure.

While but a single embodiment of the present invention has been here specifically disclosed, it will be apparent that many variations may be made therein, all within the scope of the instant invention as defined in the following claims.

I claim:

1. A combined check and relief valve comprising a housing having a chamber, inlet, outlet and relief ports in fluid communication with said chamber, said fluid communication between said inlet port and said chamber comprising a fluid conduit fixed to said housing, operatively extending between said inlet port and a point within said chamber spaced from said inlet port and having a passage opening into said chamber at said point, control means for said relief port movable between port-open and port-closed positions, and valve actuating means in said chamber, operatively associated with said conduit and said control means, exposed on one side to the pressure at said outlet port and on the other side to the pressure at said inlet port, and movable in response to said pressures exerted thereon between first, second and third positions, said first position being operatively toward said outlet port from said third position and said third position being operatively toward said inlet port from said first position, said actuating means in said first position being effective to operatively connect said conduit passage to said outlet port and to enable said relief port to close, in said second position being effective to operatively disconnect said conduit passage from said outlet port and to enable said relief port to close, and in said third position being effective to enable said relief port to open.

2. The valve of claim 1, in which said valve actuating means when in said third position is also effective to disconnect said conduit passage from said outlet port.

3. The valve of claim 2, in which said second position is spatially positioned between said first and third positions.

4. The valve of claim 1, in which said second position is spatially positioned between said first and third positions.

5. The valve of claim 1, in which said housing comprises a wall, said conduit is spaced from said wall, said relief port communicates with said space between said conduit and said wall, and said relief port control means is located in said space.

6. In the valve of claim 1, biasing means operatively connected to said relief port control means and effective to bias it to closed condition.

7. The valve of claim 6, in which said actuating means comprises a part operatively separated from said control means when said actuating means is in said first position and operatively engaging said control means when said actuating means is in said third position.

8. A combined check and relief valve comprising a housing having a chamber, inlet, outlet and relief ports in fluid communication with said chamber, said fluid communication between said inlet port and said chamber comprising a fluid conduit operatively extending between said inlet port and a point within said chamber spaced from said inlet port and having A passage opening into said chamber at said point, control means for said relief port movable between port-open and port-closed positions, and valve actuating means in said chamber, operatively associated with said conduit and said control means, exposed on one side to the pressure at said outlet port and on the other side to the pressure at said inlet port, and movable in response to said pressures exerted thereon between first, second and third positions, said first position being operatively toward said outlet port from said third position and said third position being operatively toward said inlet port from said first position, said actuating means in said first position being effective to operatively connect said conduit passage to said outlet port and to enable said relief port to close, in said second position being effective to operatively disconnect said conduit passage from said outlet port and to enable said relief port to close, and in said third position being effective to enable said relief port to open, in which said valve actuating means comprises a member sealingly sliding over that part of said conduit having said passage.

9. In the valve of claim 8, means for mounting said member on said conduit for movement relative thereto.

10. The valve of claim 9, in which said mounting means comprises a part operatively connected to said member, extending into said conduit, and having a slidable bearing relationship in said conduit.

11. In the valve of claim 10, means biasing said member toward said first position.

12. In the valve of claim 8, means biasing said member toward said first position.

13. A combined check and relief valve comprising a housing having a chamber, inlet, outlet and relief ports in fluid communication with said chamber, said fluid communication between said inlet port and said chamber comprising a fluid conduit operatively extending between said inlet port and a point within said chamber spaced from said inlet port and having a passage opening into said chamber at said point, control means for said relief port movable between port-open and port-closed positions and valve actuating means in said chamber, operatively associated with said conduit and said control means, exposed on one side to the pressure at said outlet port and on the other side to the pressure at said inlet port, and movable in response to said pressures exerted thereon between first, second and third positions, said first position being operatively toward said outlet port from said third position and said third position being operatively toward said inlet port from said first position, said actuating means in said first position being effective to operatively connect said conduit passage to said outlet port and to enable said relief port to close, in said second position being effective to operatively disconnect said conduit passage from said outlet port and to enable said relief port to close, and in said third position being effective to enable said relief port to open, in which said conduit extends in a given direction and has said passage adjacent the end of said conduit operatively directed toward said outlet opening, said actuating means being located at said end of said conduit and comprising (a) a member sealingly sliding over that part of said conduit having said passage therethrough, and (b) means mounting said member on said conduit for movement relative thereto.

14. The valve of claim 13, in which said mounting means comprises a part sealingly slidably passing through said conduit end and carrying an element slidingly bearingly engaging the interior of said conduit.

15. The valve of claim 14, in which said housing comprises a wall, said conduit is spaced from said wall, said relief port communicates with said space between said conduit and said wall, and said relief port control means is located in said space.

16. The valve of claim 15, in which said actuating means further comprises (c) a part operatively separated from said control means when said actuating means is in said first position and operatively engaging said control means when said actuating means is in said third position.

17. In the valve of claim 15, biasing means operatively connected to said relief port control means and effective to bias it to closed condition.

18. The valve of claim 17, in which said actuating means further comprises (c) a part operatively separated from said control means when said actuating means is in said first position and operatively engaging said control means when said actuating means is in said third position.

19. The valve of claim 13, in which said member comprises a cup-part sealingly telescopable over said conduit end.

20. The valve of claim 19, said passage in said conduit being at the end of said conduit and opening into said cup-part when the latter is telescoped over said conduit end.

* * * * *